United States Patent
Yang

(10) Patent No.: US 12,436,882 B1
(45) Date of Patent: Oct. 7, 2025

(54) CONTROL METHOD OF FLASH MEMORY CONTROLLER

(71) Applicant: Silicon Motion, Inc., Hsinchu County (TW)

(72) Inventor: Tzu-Yi Yang, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 10 days.

(21) Appl. No.: 18/754,116

(22) Filed: Jun. 25, 2024

(51) Int. Cl.
G06F 12/02 (2006.01)

(52) U.S. Cl.
CPC .......... G06F 12/0246 (2013.01); G06F 12/02 (2013.01); G06F 12/0253 (2013.01); G06F 12/0292 (2013.01)

(58) Field of Classification Search
CPC .. G06F 12/02; G06F 12/0246; G06F 12/0253; G06F 12/0292
USPC ........................................................ 711/103
See application file for complete search history.

(56) References Cited

U.S. PATENT DOCUMENTS

| 2022/0237115 A1* | 7/2022 | Seo ............... G06F 12/0253 |
| 2023/0333977 A1 | 10/2023 | Pandurangan |

FOREIGN PATENT DOCUMENTS

| CN | 110825310 | | 2/2020 |
| TW | I722938 | | 3/2021 |
| TW | 202205290 A | * | 2/2022 |
| TW | 202211036 | | 3/2022 |
| TW | I762380 | | 4/2022 |
| TW | I811130 B | * | 8/2023 ............. G06F 3/064 |

* cited by examiner

*Primary Examiner* — Mardochee Chery
(74) *Attorney, Agent, or Firm* — Winston Hsu

(57) ABSTRACT

The present invention provides a control method of a flash memory controller. The control method includes: after the flash memory controller is powered on, determining whether the flash memory controller encountered an abnormal power failure; if the flash memory controller encounters the abnormal power failure, determining a first block of a flash memory module having an open state; moving a portion of valid data within the first block to a specific block; setting the first block to have a close state; determining if a number of blank blocks within the flash memory module is less than a threshold value; and if the number of blank blocks within the flash memory module is less than the threshold value, selecting a second block having the close state and a lowest number of valid pages, and moving all valid data of the second block into the specific block.

15 Claims, 5 Drawing Sheets

CONTROL METHOD OF FLASH MEMORY CONTROLLER

BACKGROUND OF THE INVENTION

1. Field of the Invention

The present invention relates to flash memory.

2. Description of the Prior Art

During the process of a flash memory controller writing data to a super block of a flash memory module, if an abnormal power-off occurs, such as power off recovery (POR) or sudden power off recovery (SPOR) occurs, the flash memory controller will determine whether it has encountered an abnormal power failure after the flash memory controller is powered on again. In the event of abnormal power failure, the flash memory controller determines which data in a block with an open state is still valid, and performs a garbage collection operation on this block to move all the valid data to another block. However, if there is a lot of valid data in the block, the flash memory controller will need to spend a lot of time performing the garbage collection operation, resulting in low efficiency.

In addition, if multiple abnormal power failures occur while the flash memory controller is performing garbage collection operations, internal data management will become more complex and the number of spare blocks may be significantly reduced.

SUMMARY OF THE INVENTION

Therefore, one of the objects of the present invention is to provide a control method for a memory device, which can perform the garbage collection operation efficiently after the memory device is powered off abnormally, to solve the above-mentioned problems.

According to one embodiment of the present invention, a control method of a flash memory controller is disclosed. The flash memory controller is configured to access a flash memory module, the flash memory module comprises multiple blocks, and the control method comprises: after the flash memory controller is powered on, determining whether the flash memory controller encountered an abnormal power failure before the flash memory controller is powered on; if the flash memory controller encounters the abnormal power failure before the flash memory controller is powered on, determining a first block having an open state, and selecting a specific block within the flash memory module, wherein the specific block is a blank block; moving a portion of valid data within the first block to the specific block; setting the first block to have a close state; determining if a number of blank blocks within the flash memory module is less than a threshold value; and if the number of blank blocks within the flash memory module is less than the threshold value, selecting a second block having the close state and a lowest number of valid pages, and moving all valid data of the second block into the specific block.

According to one embodiment of the present invention, a flash memory controller is disclosed. The flash memory controller is configured to access a flash memory module, the flash memory module comprises multiple blocks, and the flash memory controller comprises a read only memory configured to store a program code, and a microprocessor configured to execute the program code to a control access of the flash memory module. The microprocessor is configured to perform the steps of: after the flash memory controller is powered on, determining whether the flash memory controller encountered an abnormal power failure before the flash memory controller is powered on; if the flash memory controller encounters the abnormal power failure before the flash memory controller is powered on, determining a first block having an open state, and selecting a specific block within the flash memory module, wherein the specific block is a blank block; moving a portion of valid data within the first block to the specific block; setting the first block to have a close state; determining if a number of blank blocks within the flash memory module is less than a threshold value; and if the number of blank blocks within the flash memory module is less than the threshold value, selecting a second block having the close state and a lowest number of valid pages, and moving all valid data of the second block into the specific block.

According to one embodiment of the present invention, a memory device comprising a flash memory module and a flash memory controller is disclosed, wherein the flash memory module comprises multiple blocks, and the flash memory controller is configured to access the flash memory module. The flash memory controller is configured to perform the steps of: after the flash memory controller is powered on, determining whether the flash memory controller encountered an abnormal power failure before the flash memory controller is powered on; if the flash memory controller encounters the abnormal power failure before the flash memory controller is powered on, determining a first block having an open state, and selecting a specific block within the flash memory module, wherein the specific block is a blank block; moving a portion of valid data within the first block to the specific block; setting the first block to have a close state; determining if a number of blank blocks within the flash memory module is less than a threshold value; and if the number of blank blocks within the flash memory module is less than the threshold value, selecting a second block having the close state and a lowest number of valid pages, and moving all valid data of the second block into the specific block.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
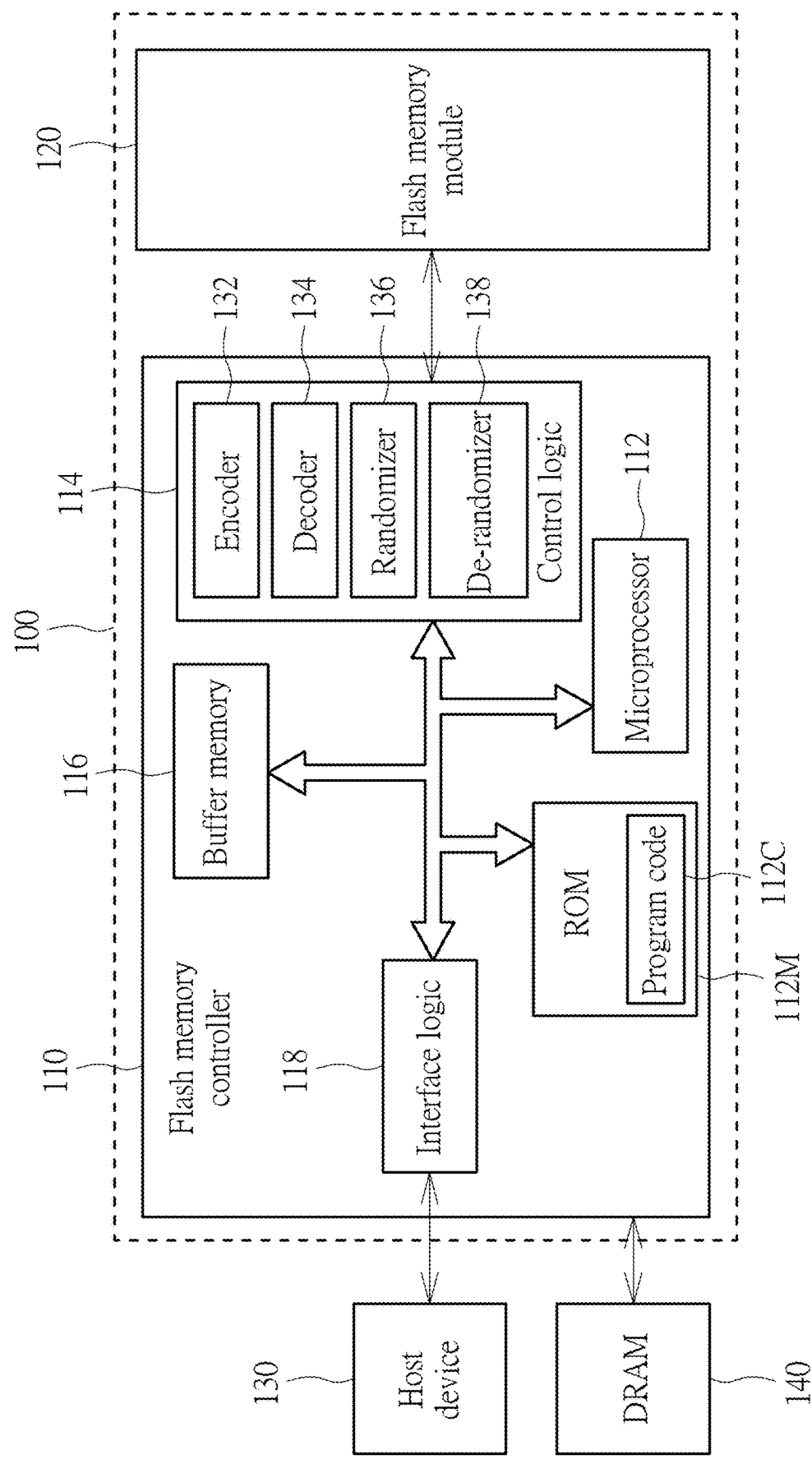
FIG. 1 is a diagram illustrating a memory device according to an embodiment of the present invention.

FIG. 1 is a diagram illustrating a memory device 100 according to an embodiment of the present invention. The memory device 100 includes a flash memory module 120 and a flash memory controller 110, wherein the flash memory controller 110 is arranged to access the flash memory module 120. The flash memory controller 110 includes a microprocessor 112, a read only memory (ROM) 112M, a control logic 114, a buffer memory 116 and an interface logic 118. The ROM 112M is arranged to store a program code 112C, and the microprocessor 112 is arranged to execute the program code 112C to control access of the flash memory module 120. The control logic 114 includes an encoder 132, a decoder 134, a randomizer 136 and a de-randomizer 138. The encoder 132 is arranged to encode data that is written into the flash memory module 120 to generate a corresponding parity (also known as an error correction code (ECC)), and the decoder 134 is arranged to decode data that is read from the flash memory module 120. The randomizer 136 is used to randomize the data written to the flash memory module 120, and the de-randomizer 138 is used to de-randomize the data read from the flash memory module 120.

In a general situation, the flash memory module 120 includes a plurality of flash memory chips, and each flash memory chip includes a plurality of blocks. A controller (e.g. the flash memory controller 110 that executes the program code 112C through the microprocessor 112) may copy, erase, and merge data for the flash memory module 120 with a block as a unit. In addition, a block can record a specific number of pages, wherein the controller (e.g. the flash memory controller 110 that executes the program code 112C through the microprocessor 112) may perform a data write operation upon the flash memory module 120 with a page as a unit. In other words, a block is the smallest erase unit in the flash memory module 120, and a page is the smallest write unit in the flash memory module 120.

In practice, the flash memory controller 110 that executes the program code 112C through the microprocessor 112 may utilize its own internal components to perform many control operations. For example, the flash memory controller 122 utilizes the control logic 114 to control access of the flash memory module 120 (more particularly, access at least one block or at least one page), utilizes the buffer memory 116 and/or a DRAM 140 to perform a required buffering operation, and utilizes the interface logic 118 to communicate with a host device 130.

In one embodiment, the memory device 100 may be a portable memory device such as a memory card which conforms to one of the SD/MMC, CF, MS and XD specifications, and the host device 130 is an electronic device able to be connected to the memory device 100, such as a cellphone, a laptop, a desktop computer, etc. In another embodiment, the memory device 100 can be a solid state drive (SSD) or an embedded storage device conforming to the universal flash storage (UFS) or embedded multi-media card (EMMC) specifications, and can be arranged in an electronic device. For example, the memory device 100 can be arranged in a cellphone, a watch, a portable medical testing device (e.g. a medical wristband), a laptop, or a desktop computer. In this case, the host device 130 can be a processor of the electronic device.

In this embodiment, the flash memory module 120 is a three-dimensional (3D) NAND-type flash memory, in which each block is composed of multiple word lines, multiple bit lines and multiple memory cells. Since the 3D NAND flash memory architecture is well known to those with ordinary knowledge in the art, no further explanation is given in the specification.

Figure 2:
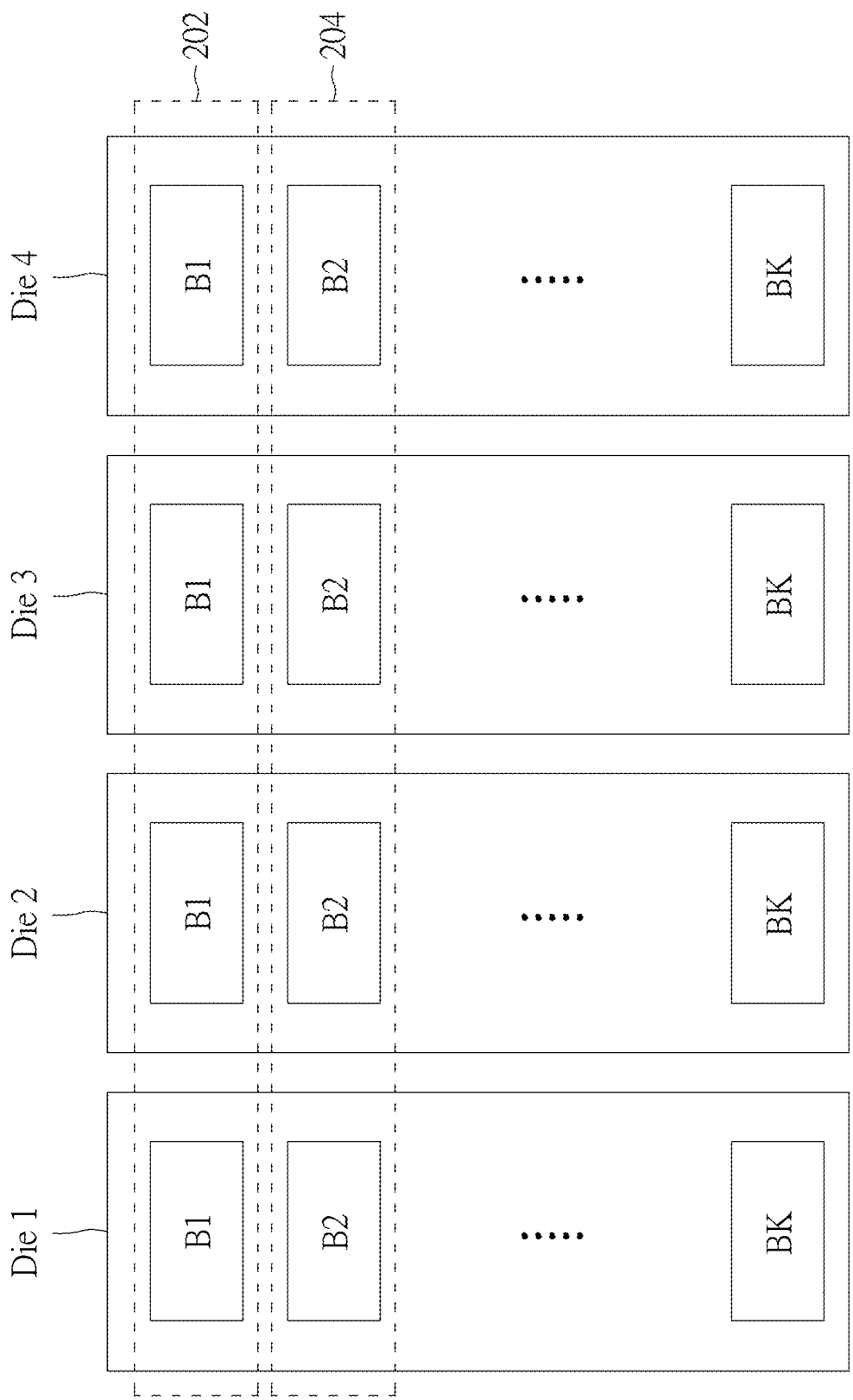
FIG. 2 is a diagram of a super block according to one embodiment of the present invention.

FIG. 2 is a diagram of a super block according to one embodiment of the present invention. As shown in FIG. 2, it is assumed that the flash memory module 120 includes four dies (die 1 to die 4), and each die includes multiple blocks B1-BK. At this time, the microprocessor 112 can configure blocks belonging to different data planes or different dies within the flash memory module 120 as a super block to facilitate management of data access. In this embodiment, there is only one data plane in one die, but the invention is not limited to this. As shown in FIG. 2, die 1 to die 4 respectively include blocks B1-BK, and the microprocessor 112 can configure the block B1 of each die as a super block 202, and configure the block B2 of each die as a super block 204, and so on. The operation of the flash memory controller 110 in accessing the super blocks 202 and 204 is similar to accessing the general blocks. For example, the super block 202 itself is an erase unit. That is, although the four blocks B1 included in the super block 202 can be erased separately, the flash memory controller 110 will definitely erase the four blocks B1 together.

Figure 3:
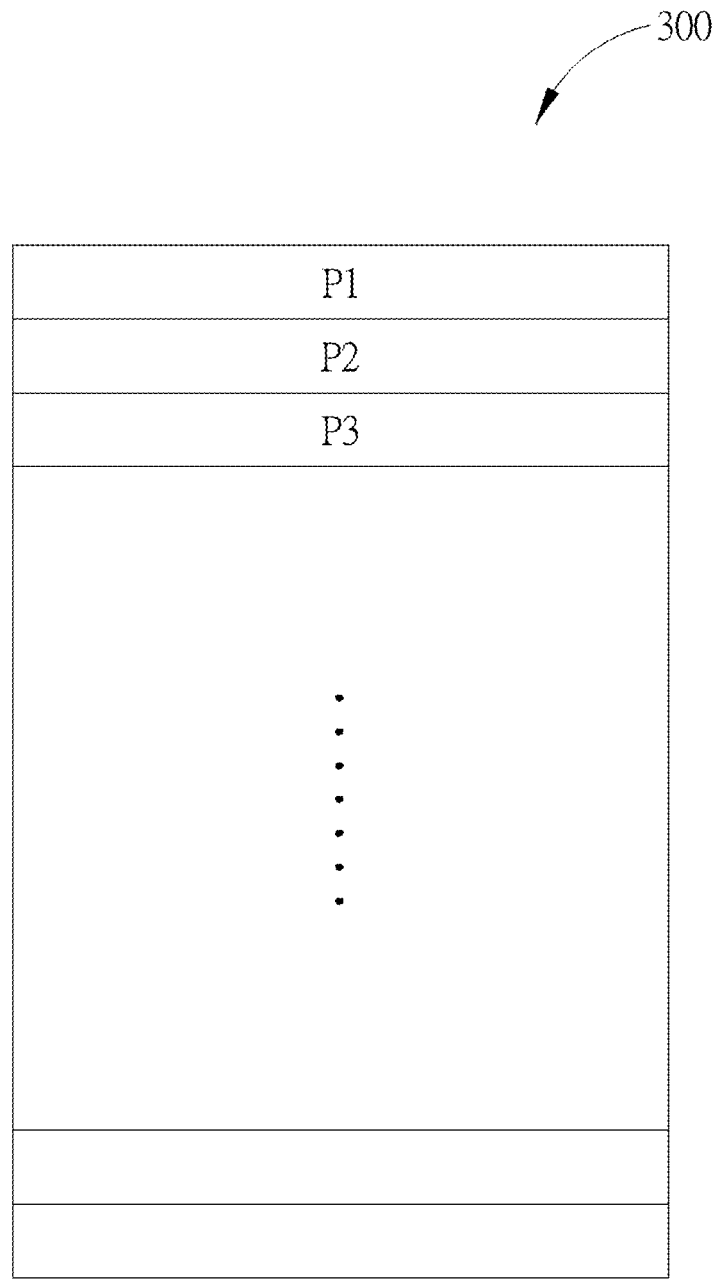
FIG. 3 is a diagram illustrating a block including multiple pages.

FIG. 3 is a diagram illustrating a block 300, wherein the block 300 can be any one of the blocks B1-BK shown in FIG. 2, and the block 300 includes multiple pages. When writing data to the super block 202, the first page P1 of the block B1 of the die 1, the first page P1 of the block B1 of the die 2, the first page P1 of the die 3 and the first page P1 of the block B1 of the die 4 can be sequentially written. Then, the data is written into the second page P2 of the block B1 of die 1, the second page P2 of the block B1 of the die 2, . . . , and so on. In other words, the flash memory controller 110 writes data to the first page P1 of each block B1 in the super block 202, and then writes data to the second page P2 of each block B1 in the super block 202. The super block is a collection block logically set by the flash memory controller 110 for the convenience of managing the flash memory module 120, not a physical collection block. In addition, when performing garbage collection, calculating the effective pages of a block, and calculating the length of writing a block, calculations can also be performed in units of super blocks.

Figure 4:
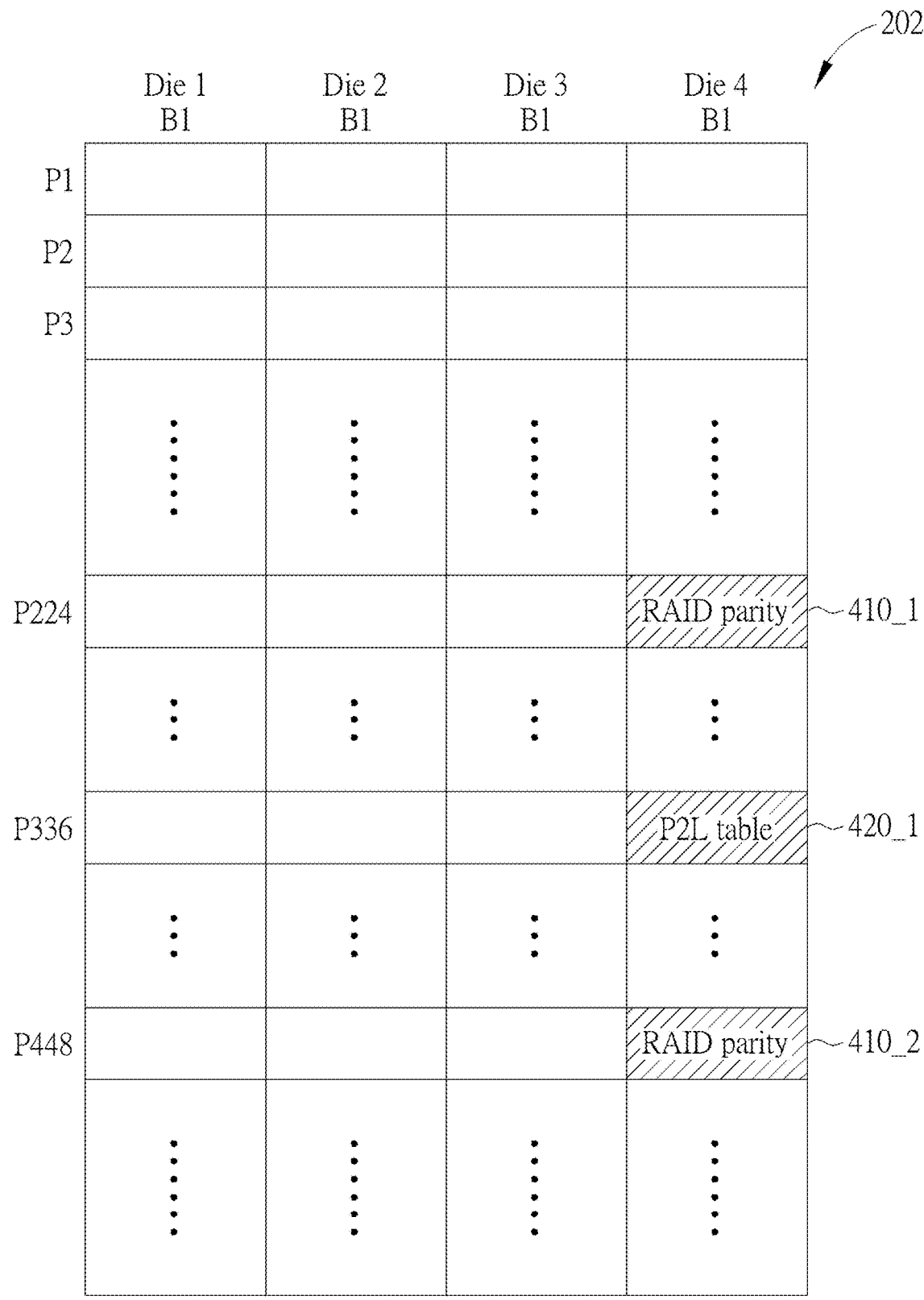
FIG. 4 is a diagram of writing data and corresponding RAID parity and P2L table into the flash memory module.

In one embodiment, regarding the operation of the host device 130 to write data to the flash memory module 120, with reference to FIG. 4, the flash memory controller 110 receives data from the host device 130, and sequentially writes the data into the super block 202. At this time, the super block 202 has an open state, that is the super block 202 is allowed to be written by the flash memory controller 110 now. In order to protect the data written into the flash memory module 120, the encoder 132 of the flash memory controller 110 performs a Redundant Array of Independent Disks (RAID) encoding operation on the data to generate a RAID parity, and the RAID parity is written into one or more pages of the super block 202. the encoder 132 performs the RAID encoding operation on the data written into the pages P1-P224 to generate a first RAID parity 410_1, and the first RAID parity 410_1 is written into the page P224 of the block B1 of die 4, wherein the first RAID parity 410_1 is only used for the decoding operation of the data of the pages P1-P224. Similarly, the encoder 132 performs the RAID encoding operation on the data written into the pages P225-P448 to generate a second RAID parity 410_2, and the second RAID parity 410_2 is written into the page P448 of the block B1 of die 4, wherein the second RAID parity 410_2 is only used for the decoding operation of the data of the pages P225-P448. In addition, because the generation of the RAID parity is known by a person skilled in the art, the detailed descriptions about the RAID parity are omitted here.

In addition, when the data is written into the super block 202, the flash memory controller 110 also creates/updates at least one physical address to logical address (P2L) mapping table, wherein the P2L mapping table is used to record the physical addresses of the super block 202 and the corresponding logical addresses of the data. Specifically, the P2L mapping table sequentially records the logical addresses of the data stored in the pages P1 of the die 1-die 4, the logical addresses of the data stored in the pages P2 of the die 1-die 4, the logical addresses of the data stored in the pages P3 of the die 1-die 4, and so on. Taking FIG. 4 as an example, the flash memory controller 110 creates a first P2L table 420_1 for the data written into pages P1-P336 of the blocks B1 of die 1-die 4, and writes the first P2L table 420_1 into the page P448 of the block B1 of die 4. Similarly, the flash memory controller 110 creates a second P2L table (not shown) for the data written into pages P337-P672 of the blocks B1 of die 1-die 4, and writes the second P2L table into the page P672 of the block B1 of die 4. In addition, because the generation of the P2L mapping table is known by a person skilled in the art, the detailed descriptions about the P2L mapping table are omitted here.

Then, if the super block 202 is completely written by the flash memory controller 110 (i.e., all the pages of the super block 202 have been written), the flash memory controller 110 will set the super block 202 to have a close state, that is the super block 202 is not allowed to be written by the flash memory controller 110 now. In addition, the state of the each super block or each block is recorded in a system table, and the system table is temporarily stored in the buffer memory 116; and the system table is immediately written into the flash memory module 120 if it is updated by the microprocessor 112.

Figure 5:
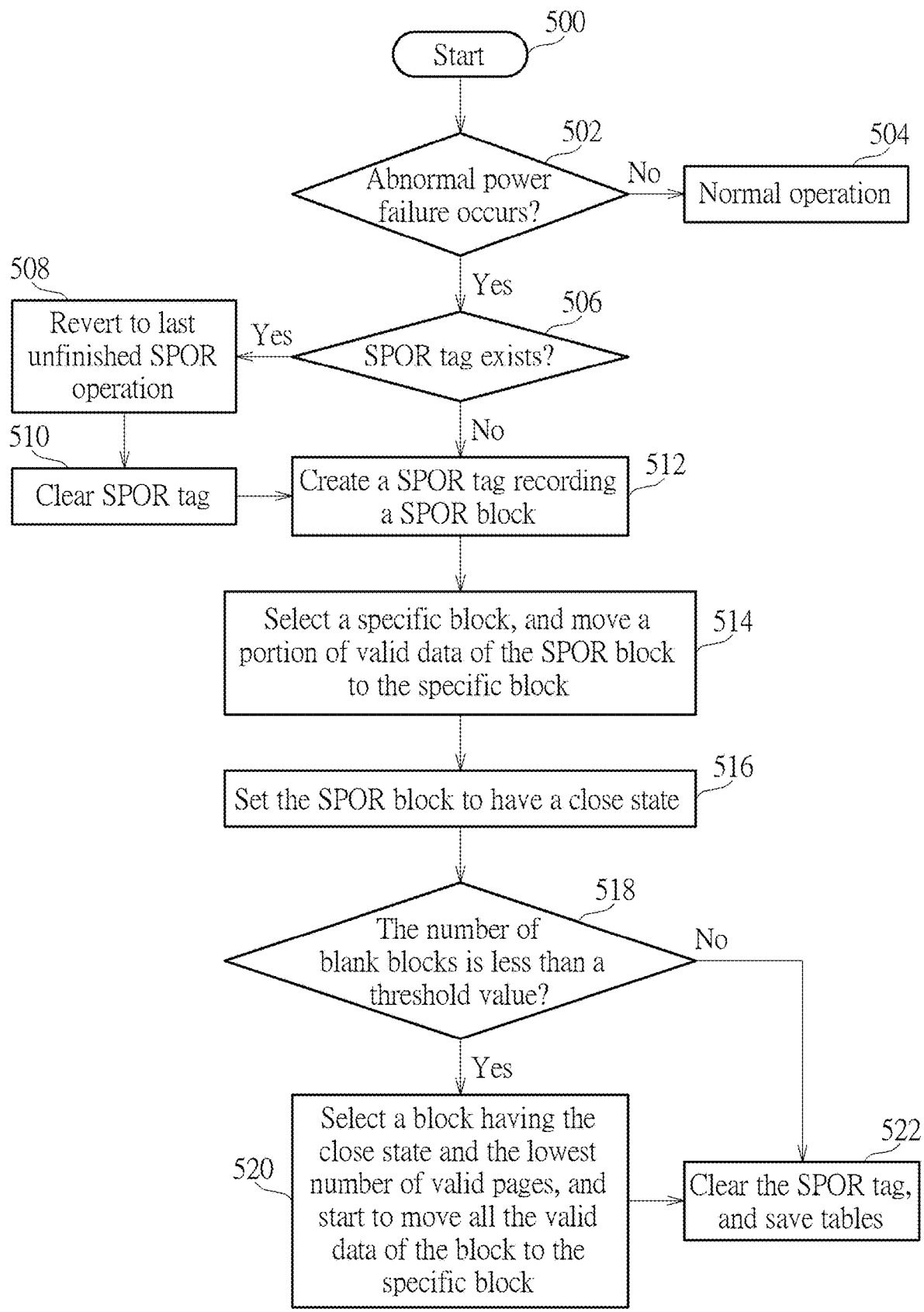
FIG. 5 is a flowchart of a control method of the flash memory controller according to one embodiment of the present invention.

FIG. 5 is a flowchart of a control method of the flash memory controller 110 according to one embodiment of the present invention. In Step 500, the flow starts, and the memory device 100 has been powered on and initialized. In Step 502, the flash memory controller 110 determines whether an abnormal power failure occurs before the memory device 100 is powered on, if yes, the flow enters Step 506; and if not, the flow enters Step 504. In one embodiment, when the memory device 100 is shut down/powered off normally, the flash memory controller 110 will store multiple temporary tables and data stored in the buffer memory 116 to the flash memory module 120, wherein the stored data includes a flag used to indicate whether the memory device 100 is powered off normally. Therefore, after powering on, the flash memory controller 110 can determine whether the memory device 100 has an abnormal power failure before by reading the above-mentioned tag stored at a specific address in the flash memory module 120. For example, when the above tag is not set correctly, it is determined that an abnormal power failure has been encountered before.

In Step 504, since the memory device 100 did not encounter an abnormal power failure before powering on, the flash memory controller 110 begins to operate normally, such as writing data from the host device 130 to the flash memory module 120, or performs a garbage collection operation on the flash memory module 120, etc., that is, the flash memory controller 110 will not execute Step 506-Step 522 in FIG. 5.

In Step 506, the microprocessor 112 of the flash memory controller 110 determines if a SPOR tag exists, if the SPOR tag exists, the flow enters Step 508; and if the SPOR tag does not exist, the flow enters Step 512. Specifically, the SPOR tag is set by the microprocessor 112 before the memory device 100 is powered on in Step 500, and the presence or absence of the SPOR tag is used to indicate whether the previous SPOR operation was successfully executed, that is, if the SPOR tag exists, it is meant that the previous SPOR operation was not successfully executed, for example, an abnormal power failure occurred when the memory device was performing the previous SPOR operation; and if the SPOR tag does not exist, it is meant that the previous SPOR operation was successfully executed. In addition, the SPOR tag records the block having the open state, and the SPOR operation indicates that the flash memory controller 110 moves at least a portion of valid data of the last block having the open state to a new block (blank block) after the memory device 100 is powered on. Hereinafter, this block having the open state recorded in the SPOR tag is called "SPOR block" in the following description. In addition, the SPOR tag is stored in the above-mention system table, so the flash memory controller 110 can determine if the SPOR tag exists by reading the system table from the flash memory module 120.

In Step 508, because the SPOR tag exists and the previous SPOR operation was not successfully executed, the flash memory controller 110 reverts to the previous unfinished SPOR operation. Specifically, the flash memory controller 110 determines the block(s) or the super block(s) having the close state that is/are generated due to the previous SPOR operation and/or generated after the previous SPOR operation, and these block(s) or super block(s) are marked as to be erased and are not used for garbage collection.

In Step 510, the microprocessor 112 of the flash memory controller 100 updates the system table by clearing the SPOR flag, and writes the updated system table into the flash memory module 120.

In Step 512, the microprocessor 112 creates a new SPOR tag recording the SPOR block, wherein the SPOR block can be obtained by reading the system table from the flash memory module 120. In addition, the microprocessor 112 updates the system table by adding this new SPOR tag, and the updated system table is written into the flash memory module 120.

In Step 514, the flash memory controller 110 selects a specific block (blank block) from the flash memory module 120, and moves at least a portion of the valid data of the SPOR block into the specific block. For example, the flash memory controller 110 can move the valid data corresponding to two word-lines of the SPOR block to the specific block. In another example, the flash memory controller 110 can move the valid data from the last written page to a page immediately following the last RAID parity or the last P2L table to the specific block. Taking FIG. 4 as an example, if the last written page of the super block 202 is the page P400, the flash memory controller 110 may move the valid data of the pages P225-P400 to the specific block, wherein the page P225 is immediately following the last RAID parity 410_1, and the valid data of the remaining pages P1-P224 are not moved to the specific block now; or the flash memory controller 110 may move the valid data of the pages P337-P400 to the specific block, wherein the page P337 is immediately following the last P2L table 420_1, and the valid data of the remaining pages P1-P336 are not moved to the specific block now.

In Step 516, the flash memory controller 110 sets the SPOR block to have the close state, that is the SPOR block is not allowed to be written. In addition, the flash memory controller 110 updates the system table to record that the SPOR block has the close state, and the updated system table is written into the flash memory module 120.

In Step 518, the flash memory controller 110 determines if the number of the spare blocks (i.e., blank blocks) within the flash memory module 120 is less than a threshold value, if yes, the flow enters Step 520 to perform a garbage collection operation; and if not, the flow enters Step 522.

In Step 520, the flash memory controller 110 selects a block having the close state and the lowest number of valid pages (i.e., lowest valid data amount) among all other blocks with the close state, and starts to move all the valid data of this block to the specific block selected in Step 514. After the all the valid data of this block is moved to the specific block, this block can be erased to be a spare block. In addition, after all the valid data within the block having the close state and the lowest valid page is moved to the specific block, the flash memory controller 110 may move other block(s) having the close state to the specific block, and the flow enters Step 522.

In Step 522, the flash memory controller 110 clears the SPOR tag, and saves the tables such as the P2L mapping table(s) and the system table into the flash memory module 120.

By using the embodiment shown in FIG. 5, the flash memory controller 110 can perform the SPOR operation efficiently, and the number of the spare blocks of the flash memory module 120 can also be controlled without reducing it too much.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a flash memory controller, wherein the flash memory controller is configured to access a flash memory module, the flash memory module comprises multiple blocks, and the control method comprises:
   after the flash memory controller is powered on, determining whether the flash memory controller encountered an abnormal power failure before the flash memory controller is powered on;
   if the flash memory controller encounters the abnormal power failure before the flash memory controller is powered on, determining a first block having an open state, and selecting a specific block within the flash memory module, wherein the specific block is a blank block;
   moving a portion of valid data within the first block to the specific block;
   setting the first block to have a close state;
   determining if a number of blank blocks within the flash memory module is less than a threshold value; and
   if the number of blank blocks within the flash memory module is less than the threshold value, selecting a second block having the close state and a lowest number of valid pages, and moving all valid data of the second block into the specific block.

2. The control method of claim 1, wherein the step of moving the portion of valid data within the first block to the specific block comprises:
   moving the valid data from a last written page to a page immediately following a last RAID parity to the specific block, wherein the valid data before the page is not written into the specific block now.

3. The control method of claim 1, wherein the step of moving the portion of valid data within the first block to the specific block comprises:
   moving the valid data from a last written page to a page immediately following a last physical address to logical address (P2L) mapping table to the specific block, wherein the valid data before the page is not written into the specific block now.

4. The control method of claim 1, further comprising:
   if the flash memory controller encounters the abnormal power failure before the flash memory controller is powered on, creating a tag recording the first block and stores the tag in a system table; and
   if the number of blank blocks within the flash memory module is not less than the threshold value, clearing the tag and updating the system table.

5. The control method of claim 4, further comprising:
   after moving all the valid data of the second block into the specific block, clearing the tag and updating the system table.

6. A flash memory controller, wherein the flash memory controller is configured to access a flash memory module, the flash memory module comprises multiple blocks; and the flash memory controller comprises:
   a read only memory, configured to store a program code; and
   a microprocessor, configured to execute the program code to a control access of the flash memory module;
   wherein the microprocessor is configured to perform the steps of:
   after the flash memory controller is powered on, determining whether the flash memory controller encountered an abnormal power failure before the flash memory controller is powered on;
   if the flash memory controller encounters the abnormal power failure before the flash memory controller is powered on, determining a first block having an open state, and selecting a specific block within the flash memory module, wherein the specific block is a blank block;
   moving a portion of valid data within the first block to the specific block;
   setting the first block to have a close state;
   determining if a number of blank blocks within the flash memory module is less than a threshold value; and
   if the number of blank blocks within the flash memory module is less than the threshold value, selecting a second block having the close state and a lowest number of valid pages, and moving all valid data of the second block into the specific block.

7. The flash memory controller of claim 6, wherein the step of moving the portion of valid data within the first block to the specific block comprises:
   moving the valid data from a last written page to a page immediately following a last RAID parity to the specific block, wherein the valid data before the page is not written into the specific block now.

8. The flash memory controller of claim 6, wherein the step of moving the portion of valid data within the first block to the specific block comprises:
   moving the valid data from a last written page to a page immediately following a last physical address to logical address (P2L) mapping table to the specific block, wherein the valid data before the page is not written into the specific block now.

9. The flash memory controller of claim 6, further comprising:
   if the flash memory controller encounters the abnormal power failure before the flash memory controller is powered on, creating a tag recording the first block and stores the tag in a system table; and if the number of blank blocks within the flash memory module is not less than the threshold value, clearing the tag and updating the system table.

10. The flash memory controller of claim 9, further comprising:
after moving all the valid data of the second block into the specific block, clearing the tag and updating the system table.

11. A memory device, comprising:
a flash memory module, wherein the flash memory module comprises multiple blocks; and
a flash memory controller, configured to access the flash memory module;
wherein the flash memory controller is configured to perform the steps of:
after the flash memory controller is powered on, determining whether the flash memory controller encountered an abnormal power failure before the flash memory controller is powered on;
if the flash memory controller encounters the abnormal power failure before the flash memory controller is powered on, determining a first block having an open state, and selecting a specific block within the flash memory module, wherein the specific block is a blank block;
moving a portion of valid data within the first block to the specific block;
setting the first block to have a close state;
determining if a number of blank blocks within the flash memory module is less than a threshold value; and
if the number of blank blocks within the flash memory module is less than the threshold value, selecting a second block having the close state and a lowest number of valid pages, and moving all valid data of the second block into the specific block.

12. The memory device of claim 11, wherein the step of moving the portion of valid data within the first block to the specific block comprises:
moving the valid data from a last written page to a page immediately following a last RAID parity to the specific block, wherein the valid data before the page is not written into the specific block now.

13. The memory device of claim 11, wherein the step of moving the portion of valid data within the first block to the specific block comprises:
moving the valid data from a last written page to a page immediately following a last physical address to logical address (P2L) mapping table to the specific block, wherein the valid data before the page is not written into the specific block now.

14. The memory device of claim 11, further comprising:
if the flash memory controller encounters the abnormal power failure before the flash memory controller is powered on, creating a tag recording the first block and stores the tag in a system table; and
if the number of blank blocks within the flash memory module is not less than the threshold value, clearing the tag and updating the system table.

15. The memory device of claim 14, further comprising:
after moving all the valid data of the second block into the specific block, clearing the tag and updating the system table.

* * * * *